United States Patent

Hara

Patent Number: 5,349,416
Date of Patent: Sep. 20, 1994

[54] DISPLAY APPARATUS

[75] Inventor: Masaharu Hara, Kawasaki, Japan

[73] Assignee: Nikon Corporation, Tokyo, Japan

[21] Appl. No.: 132,212

[22] Filed: Oct. 6, 1993

Related U.S. Application Data

[63] Continuation of Ser. No. 998,639, Dec. 29, 1992, abandoned, which is a continuation of Ser. No. 751,741, Aug. 29, 1991, abandoned.

[30] Foreign Application Priority Data

Sep. 4, 1990 [JP] Japan ................ 2-92438[U]

[51] Int. Cl.⁵ .................................. G03B 17/20
[52] U.S. Cl. .......................... 354/471; 354/127.11
[58] Field of Search .............. 354/465, 466, 471, 472, 354/473, 474, 127.11, 127.12

[56] References Cited

U.S. PATENT DOCUMENTS

| | | | |
|---|---|---|---|
| 3,599,545 | 8/1971 | Durr et al. | 354/472 |
| 3,678,824 | 7/1972 | Durr | 354/472 |
| 4,074,292 | 2/1978 | Nakamoto et al. | 354/474 |
| 4,165,930 | 8/1979 | Matsumoto et al. | 354/466 |
| 4,204,756 | 5/1980 | Kobori et al. | 354/473 |
| 4,217,044 | 8/1980 | Yamazaki et al. | 354/474 |
| 4,265,522 | 5/1981 | Matsumoto et al. | 354/466 |
| 4,529,290 | 7/1985 | Kobori et al. | 354/474 |
| 4,576,458 | 3/1986 | Cho et al. | 354/466 |
| 4,717,936 | 1/1988 | Shimizu et al. | 354/471 |
| 4,788,560 | 11/1988 | Miura | 346/108 |
| 4,788,569 | 11/1988 | Yamada et al. | 354/409 |

Primary Examiner—Russell E. Adams
Attorney, Agent, or Firm—Shapiro and Shapiro

[57] ABSTRACT

A display apparatus is composed of a first emission element, a second emission element different from the first emission element in emission color, and a reflecting member for displaying by reflecting light from the second emission element. The reflecting member has a color which is a substantially complementary color to the emission color of the first emission element, so that it does not reflect light from the first emission element, but reflects light from the second emission element.

8 Claims, 4 Drawing Sheets

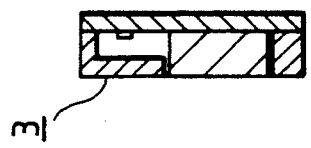
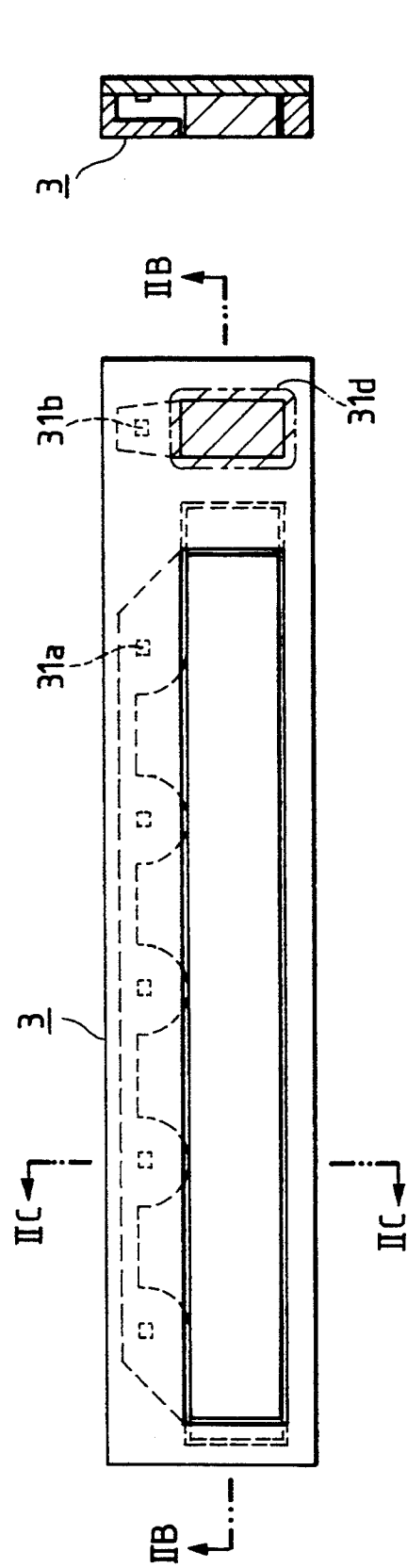
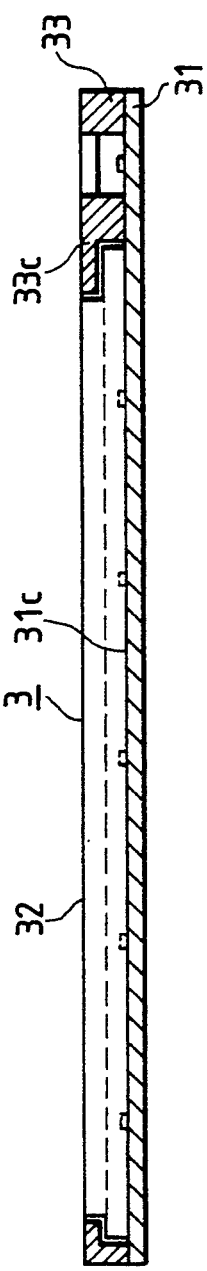

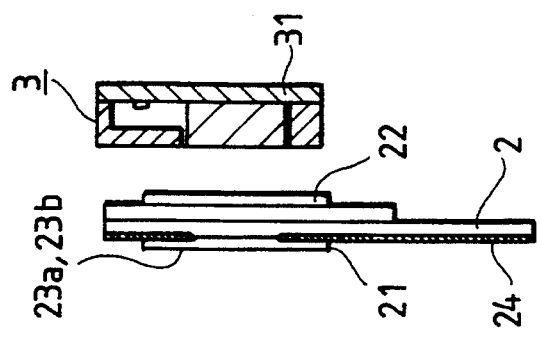
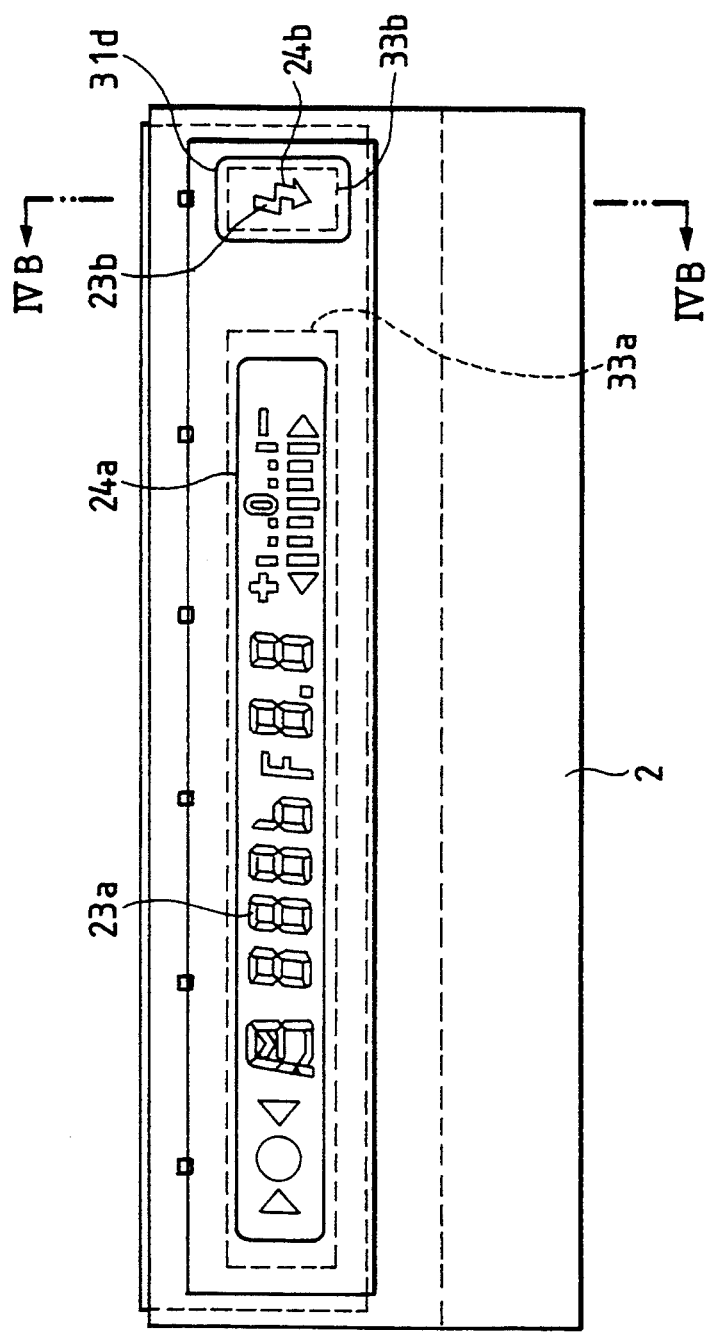

DISPLAY APPARATUS

This is a continuation of U.S. application Ser. No. 998,639 filed Dec. 29, 1992, which is a continuation of U.S. application Ser. No. 751,741 filed Aug. 29, 1991, both now abandoned.

BACKGROUND OF THE INVENTION

1. Field of the Invention

This invention relates to a display apparatus in which an emission element structure such as LED has been located behind the liquid crystal display structure.

2. Related Background Art

Conventionally in this type of display apparatus, a light shielding member was provided so that each display light used in a liquid crystal display structure and self-emitting display structure does not leak from the respective positions as disclosed in U.S. Pat. No. 4,788,569. The liquid crystal display structure was also used in the self-emitting display structure.

Since, however, the liquid crystal display structure is also used in the self-emitting display structure in a thus constituted display apparatus, light leakage from the adjacently provided liquid crystal display structure can be reduced by putting the negative liquid crystal in non-lighted state. In this case, one special-purpose liquid crystal pattern will be required. Therefore the addition of the liquid crystal pattern makes the circuit scale larger, and the wiring more complicated, requiring more space and further increasing the cost.

Also to prevent leakage of the respective lights, it is effective to make the width of the light shielding member large. Therefore, the display apparatus is made larger in size, and accordingly the display optical system is made larger, leading to a larger-sized camera finally.

SUMMARY OF THE INVENTION

It is an object of the present invention to provide a small-size display apparatus in which the leakage of each illuminating light used in the adjacently provided display structure into each display pattern unit is securely prevented at low cost.

To accomplish such an object, a display apparatus according to the present invention may comprise a first emission element, a second emission element different from the first emission element in emission color, a substrate for installing the first and second emission elements, first display means which is placed opposite to the first emission element and displays a first content of display, second display means which is placed opposite to the second emission element and displays a second content of display different from that of the first display means by means of lighting and non-lighting of the second emission element, and a body of a color which is a substantially complementary color to the emission color of the first emission element placed on the substrate surface corresponding to the second emission element.

According to the present invention, other color lights will not leak into each display means.

BRIEF DESCRIPTION OF THE DRAWINGS

FIG. 2A is an enlarged view of a display apparatus in FIG. 1, FIG. 2B is a sectional view taken on line IIB—IIB of FIG. 2A, and FIG. 2C is a sectional view taken on line IIC—IIC of FIG. 2A;

FIG. 4A is an enlarged view of the display apparatus and liquid crystal panel according to the present invention in the display system within the finder of the camera in FIG. 1, and FIG. 4B is a sectional view taken on line IVB—IVB in FIG. 4A.

DESCRIPTION OF THE PREFERRED EMBODIMENTS

Figure 1:
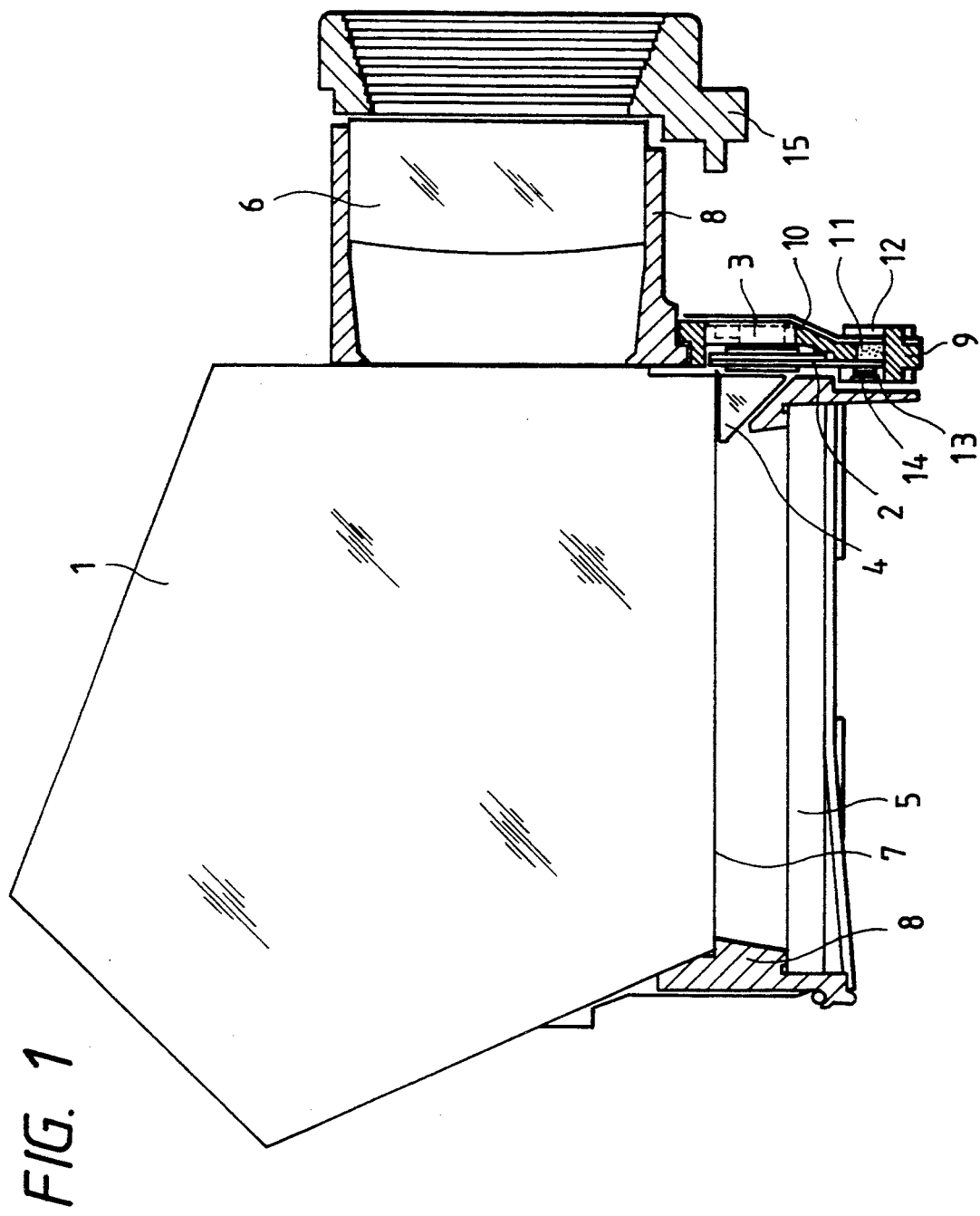
FIG. 1 is a sectional view showing an embodiment in which a display apparatus according to the present invention has been applied to the display system in the finder of a camera.

The present invention will hereinafter be described in detail with respect to embodiments thereof shown in the drawings.

FIG. 1 is a sectional view showing an embodiment in which a display apparatus according to the present invention has been applied to the display system within the finder of a single-lens reflex camera. In FIG. 1, a liquid crystal panel 2 and an LED unit 3 are placed on the finder side below a pentaprism 1, and an image on the liquid crystal panel 2 is irradiated with light from the LED unit 3, and is led in the pentaprism 1 from the lower surface thereof through a conical prism 4.

A well-known screen 5, an eyepiece 6 and a visual field frame 7 are respectively secured by means of a prism box 8. A display unit incorporated into a subassembly has been inserted into the prism box 8 from the right side in FIG. 1 and secured. In this display unit, the liquid crystal panel 2, the LED unit 3, a flexible substrate 10, a conducting connector 11, pressure contact plates 12 and 13, and machine screws 14 are disposed in a holder 9 of the main body. The liquid crystal panel 2 has a display unit for displaying characters, numerals or a specified pattern column which display camera photographing information on one side, and a display unit for displaying other characters, numerals or specified shape on the other side.

The flexible substrate 10 has a function of feeding an electric signal from a display driver (not shown) and a power supply or electric signal to drive the LED to the liquid crystal panel 2 and the LED unit 3. Further the conducting connector 11 has a function for electrically connecting the liquid crystal panel 2 and the LED unit 3 with the flexible substrate 10, and is secured by means of pressure contact plates 12 and 13 and machine screws 14 to secure the contact pressure.

FIG. 2A–2C show the construction of the LED unit 3 in the display apparatus within the finder as described in FIG. 1.

Figure 3:
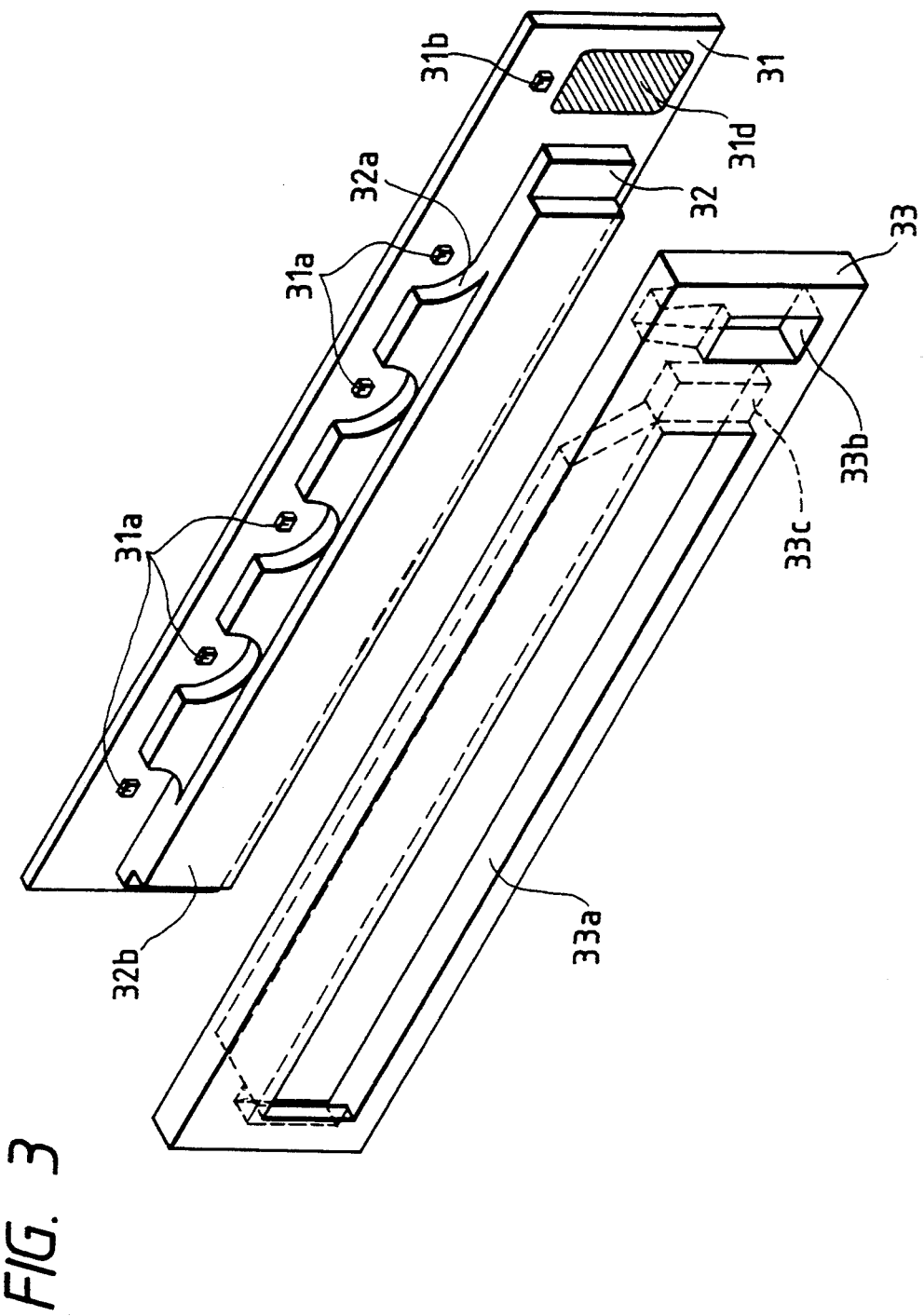
FIG. 3 is an exploded perspective view of the display apparatus in FIG. 2.

FIG. 3 is an exploded perspective view of the LED unit 3 shown in FIG. 2.

In these views, the LED unit 3 is composed of an LED chip substrate 31, a light guide 32, and a reflective frame 33. On a surface of the LED chip substrate 31, a plurality of yellow-green light emitting LED chips 31a and red light emitting LED chip 31b are disposed for wiring. The substrate surface 31c of the LED chip substrate 31 is colored in white or a color similar thereto, or applied with resist. Further on a part of the surface of the LED chip substrate 31 in proximity to the red LED chip 31b, a region 31d colored in red is provided.

Also on the other side, a soldering land (not shown) is provided to electrically connect with the above-mentioned flexible substrate 10. The wiring connected with each LED chip is drawn out on this rear side through a through hole (not shown), and the LED chips 31a are connected in parallel with each other. The LED chip 31b is wired so that it is different from and independent of the LED chips 31a. A light guide 32 is made of highly transparent, colorless material such as acryl, and a circular arc shape 32a is provided at a position corresponding to the placement of each LED chip 31a, its surface 32b being a diffusing surface.

A reflective frame 33 is made of opaque, white material with high reflectance, and openings 33a and 33b are provided at portions corresponding to a light guide surface 32b and the region 31d colored in red, and each opening 33a, 33b is partitioned with a light shielding unit 33c.

In this construction, a light guide 32 is held between the LED chip substrate 31 and the reflective frame 33, which are connected through bosses (not shown) in the reflective frame 33 and substrate holes (not shown) by means of caulking or bonding. Since the LED chips 31a and the LED chip 31b are disposed so that they are hidden behind the reflective frame 33 in the LED unit 3 as shown in FIG. 2A, the LED chips 31a and the LED chip 31b cannot be viewed directly from a surface 32b to light the liquid crystal panel 2.

Emission from each LED chip 31a is reflected several times between the inner surface of the reflective frame 33, the circular arc shape 32a of the light guide, and the LED chip substrate surface 31c to secure a surface light source with almost uniform brightness on the LED chip substrate surface 31c. Also emission from the LED chip 31b is reflected on the inner surface of the reflective frame 33 and the LED chip substrate surface 31c to secure a surface light source with almost uniform brightness on red-colored region 31d and a part of the LED chip substrate surface 31c.

FIGS. 4A and 4B show the LED unit 3 and the liquid crystal panel 2 for the display apparatus within the finder in FIG. 1. In FIG. 4B, the liquid crystal panel 2 performs so-called "negative display" (normally light-shielded state except segment electrodes), and in a twist nematic type liquid crystal, front and rear polarized light plates 21 and 22 are parallel in the direction of polarized light.

A first display unit 23a displays characters, numerals or a specified shape by means of transmission and light shielding of the segment electrode unit of the liquid crystal panel 2. A light shielding mask 24 forms the display frame. In a second display unit 23b, a part of the light shielding mask 24 provided at the liquid crystal panel 2 is apertured to display characters, numerals or a specified shape by means of the transmitted light. In the above embodiment, photographing information such as the photographing exposure mode, shutter speed, iris diaphragm, and exposure indicator can be displayed on the first display unit 23a. The second display unit 23b shows a strobo ready mark (not shown) which lights by completing charging of an externally attached stroboscope.

(First Display Unit 23a)

The inside of the frame 24a formed by the light shielding mask 24 is lighted by yellow-green light from the LED unit 3. The liquid crystal panel 2 hardly transmits the light if no liquid crystal is driven because the liquid crystal panel 2 is of the negative display type as mentioned above. If the liquid crystal unit is driven, light transmits from a specified segment electrode to display characters, numerals or a specified shape. Thus, while the camera is in use (while the timer is being lightly pressed with power supply on), the yellow-green chips 31a of the LED unit 3 are always lighted.

(Second Display Unit 23b)

The strobo ready mark is formed by an opening 24b of the light shielding mask 24. A portion of the polarized light plate 22 is deleted in the vicinity of the opening 24b of the liquid crystal panel 2. Also, the segment electrode unit is constructed not to be wired in the vicinity of the opening 24b. For this reason, the ready mark is designed to be displayed by lighting or turning off the red chip 31b of the LED unit 3. In other words, while the camera is in use (while the timer is being lightly pressed with power supply on), there are two cases: the red chip 31b of the LED unit 3 lights or is off.

The operation of the above embodiment with the above construction will now be described.

(i) Turn on a camera power switch (not shown) and lightly press a release button (not shown), and a signal from an exposure control circuit unit (not shown) will drive an LCD driver to apply a signal to the segment electrode unit in the liquid crystal panel 2. Also turning on the camera power switch lights the yellow green emitting chips 31a of the LED unit 3.

(ii) In the above-mentioned state (i), red emitting chip 31b of the LED unit 3 lights when receiving a signal of completed charging from a built-in stroboscope or the outside attached stroboscope (not shown), and turns off when not receiving.

(iii) When the chip 31b is not lighted in the above-mentioned state (ii), the light guide surface 32b becomes a surface light source by lighting of the chips 31a. In other words, light from the chips 31a lights the white surface of the light guide 32, the LED chip substrate surface 31c and the opening 33a of the reflective frame to secure the surface light source of the light guide surface 32b by its reflection. By the dispersion of this light, the light is also applied to the end surface of the opening 33a on the light shielding unit 33c side.

Although the light shielding unit 33c is made of white, opaque material, it transmits light somewhat if it is plastic. This transmitted light reaches the adjacent opening 33b. In the case of the above embodiment, however, a colored region 31d in red, which is a substantially complementary color to yellow-green, (the color of the transmitted light), is provided on a part of the LED chip substrate 31, and therefore the transmitted light is absorbed.

Therefore, the first display unit 23a of the liquid crystal panel 2 can be viewed as a display by lighting of the chip 31a. However, the strobo ready mark (opening 24b) of the second display unit 23b cannot be viewed as a display because the red-colored region 31d on a part of the LED chip substrate 31 of the LED unit 3 does not emit any light. Thus, it can be recognized that charging of the stroboscope has not yet been completed.

(iv) When the chip 31b is lighted in the above-mentioned state (ii), the red-colored region 31d of the LED chip substrate 31 does not emit any light due to light leakage from the light shielding unit 33c in the above-mentioned state (iii). However, the red light due to emission of the chip 31b lights the red-colored region 31d by reflection on the LED chip substrate surface 31c, the red-colored region 31d and the reflective frame opening 33b.

Since each of the above-mentioned surfaces has been colored in white and red as described, the red light of the chip 31b is not absorbed, and the red-colored region 31d emits red light. Therefore, with the lighting of the chips 31a, the first display unit 23a of the liquid crystal panel 2 can be viewed as a display, and at the same time, the strobo ready mark (opening 24b) of the second display unit 23b lights because the red-colored region 31d of the LED unit 3 emits light. It can be thus recognized that charging of the stroboscope has been completed.

In the above embodiment, a two-color yellow green and red lighting device has been used. However, the invention is not limited to this, and a similar effect can be obtained by any lighting device for two colors which are substantially complementary.

In the above embodiment, LED has been used for the display unit. However, the present invention is not limited to this, and a similar effect can be obtained by any display system in which display characters, etc. are arranged in parallel only through a light shielding mask.

Further in the above embodiments, leakage of yellow-green light when it permeates a light shielding member has been described. However, the invention is effective for leakage of other lights such as light entering a clearance between the reflective frame and the LED chip substrate in the embodiment and indirect light entering the opening 33b after reflecting once outside the LED unit.

As explained above, the display apparatus according to the present invention comprises a first emission element, a second emission element different from the first emission element in emission color and a reflecting member for reflecting light from the second emission element, the reflecting member having a color which is a substantially complementary color to the emission color of the first emission element.

Accordingly, even if the first emission element emits light, the light therefrom is not reflected by the reflecting member. So an observer does not misunderstand the display because a turn-on and off in the second emission element can be observed regardless of the turn-on and off in the first emission element.

What is claimed is:

1. A display apparatus, comprising:
   a first emission element;
   a second emission element different from said first emission element in emission color; and
   a reflecting member for displaying by reflecting light from said second emission element, wherein said reflecting member has a color which is a substantially complementary color to the emission color of said first emission element, and does not reflect light from said first emission element, but reflects light from said second emission element.

2. The display apparatus according to claim 1, which displays at the inside of a camera finder, with a displays from said first emission element indicating photographing information.

3. A display apparatus, comprising:
   a first emission element;
   a second emission element different from said first emission element in emission color;
   a substrate to which said first and said second emission elements have been installed;
   first display means placed opposite to said first emission element and receiving light from said first emission element for making a first display;
   second display means placed opposite to said second emission element and receiving light from said second emission element for making a second display having a content which is different from said first display; and
   a reflecting member for reflecting light from said second emission element to said second display means, said reflecting member having a color which is a substantially complementary color to the emission color of said first emission element, such that it does not reflect light from said first emission element, but reflects light from said second emission element.

4. The display apparatus according to claim 3, wherein said first emission element is a yellow-green LED, said second emission element is a red LED, and said reflecting member is red.

5. The display apparatus according to claim 3, which displays at the inside of a camera finder, and wherein said first emission element displays first photographing information, and said second emission element displays second photographing information different from said first photographing information.

6. A display apparatus, comprising:
   a first emission element;
   a second emission element different from said first emission element in emission color; and
   a reflecting member for reflecting light from said second emission element to make a display thereof, said reflecting member having a color which is a substrate complementary color to the emission color of said first emission element.

7. A display apparatus according to claim 6, wherein said first emission element is a yellow-green LED and said second emission element is a red LED.

8. A display apparatus, comprising:
   a first emission element;
   a second emission element different from said first emission element in emission color; and
   a reflecting member for reflecting light from said second emission element to make a display thereof, wherein said reflecting member is substantially non-reflective for light having the emission color of said first emission element.

* * * * *